(No Model.)
M. SWENSON.
COTTON PRESS.
No. 557,089. Patented Mar. 24, 1896.
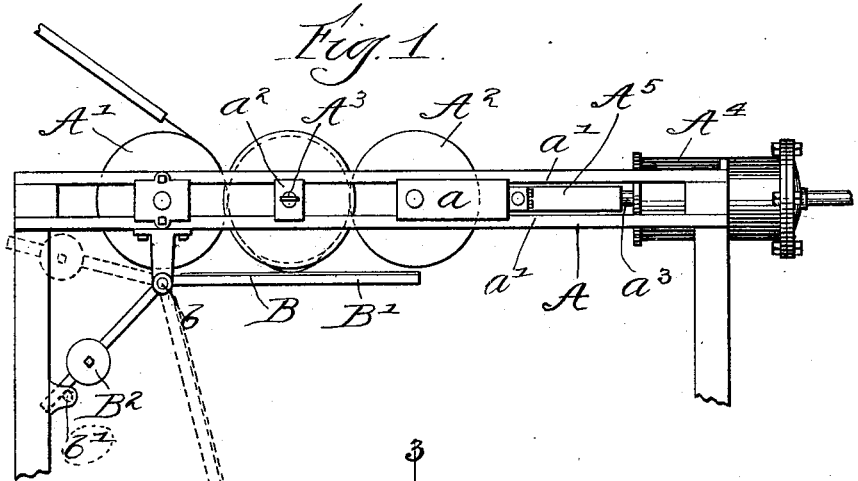
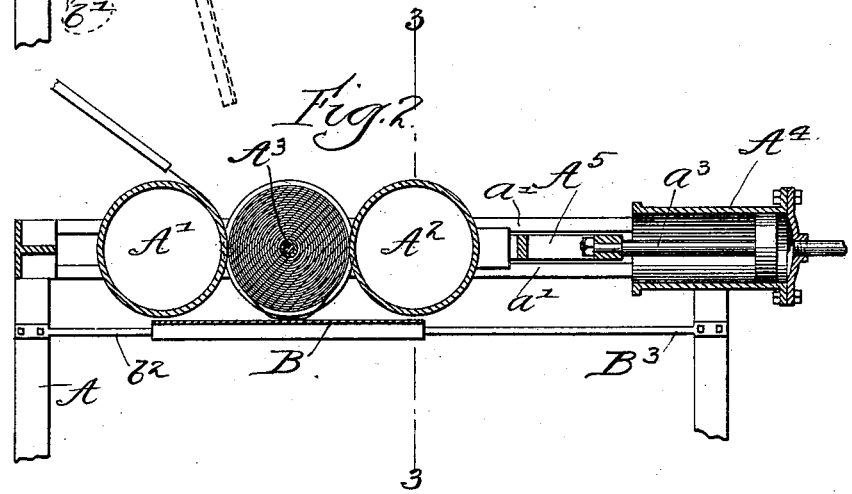
Witnesses
Wm. F. Henning
John C. Otey
Inventor
Magnus Swenson
by Geo. E. Waldo.
Atty.

UNITED STATES PATENT OFFICE.

MAGNUS SWENSON, OF CHICAGO, ILLINOIS.

COTTON-PRESS.

SPECIFICATION forming part of Letters Patent No. 557,089, dated March 24, 1896.

Application filed November 14, 1895. Serial No. 568,887. (No model.)

*To all whom it may concern:*

Be it known that I, MAGNUS SWENSON, a citizen of the United States, and a resident of Chicago, in the county of Cook and State of Illinois, have invented certain new and useful Improvements in Cotton-Presses, of which the following is a specification.

This invention relates to improvements in cotton-presses, and relates particularly to improvements in cotton-presses of the type in which the cotton delivered thereto in the form of a continuous bat is wound under pressure upon a bale core or spindle, arranged between positively-driven compression-rolls, into a cylindrical bale of desired size. Heretofore the operation of presses of this type has at times been unsatisfactory, owing to a tendency of the bat to sag and break between the compression-rolls on the under side of the bale when the bale has attained a considerable size. Constant attention on the part of employés is thus necessary in order that the bat shall not break and be discharged beneath the press instead of being wound upon the bale in the desired manner.

The object of the present invention is to overcome the above objectionable feature by providing means to prevent the sagging and breaking of the bat and to provide means also whereby in case the bat does break the loose end thereof will be conducted around the bale, thus insuring that the baling operation when once begun will proceed continuously without interruption from the breaking of the bat and its discharge beneath the press.

To this end my invention consists in the use, in combination with the compression-rolls and bale-core, of a platen which extends beneath the bale-core and closely adjacent to the compression-rolls. Said table or platen thus operates as a combined support and guide, operating to support the bat in case it sags between the compression-rolls, and in case it breaks operating to guide it into contact with the rear roll and upward between it and the bale forming on said bale-core. In order that said platen may not interfere with the discharge of the finished bale beneath the press, I also prefer to make the said platen removable from beneath the bale-core.

The invention also consists in the various other features, combinations of features, and details of construction hereinafter described, and then pointed out in the claims.

In the accompanying drawings a press embodying my invention is fully illustrated.

Figure 1 is a side view of a press embodying my improvements. Fig. 2 is a vertical longitudinal section through a press, showing a modified form of my invention; and Fig. 3 is a transverse vertical sectional view on the line 3 3 of Fig. 2.

Referring now to the drawings, A designates the frame of the press on which the operative parts thereof are supported.

The operative parts of the press comprise a compression-roller $A'$, mounted in stationary bearings, a bodily-movable compression-roller $A^2$, mounted in sliding bearing-blocks $a$, fitted to and longitudinally movable in guides or ways $a'$, formed in the press-frame A, and a bale core or spindle $A^3$, mounted in sliding bearing-blocks $a^2$, fitted to and longitudinally movable in the guide-slots $a'$ in the same manner as the blocks $a$ of the movable compression-roll $A^2$.

The desired pressure on the bale in process of formation is created by means of a hydraulic cylinder $A^4$ and a piston-rod $a^3$, affixed to a piston, which is applied to the movable compression-roll $A^2$, so as to resist its rearward movement. As shown, the bearing-blocks $a$ of said movable roll $A^2$ are connected by a cross-head $A^5$, which is rigidly connected to the forward end of the piston-rod $a^3$. The desired pressure in the cylinder $A^4$ may be generated in any desired manner; but as said means in no way relate to my present invention they are not shown. Positive rotary movement in the same direction is imparted to the compression-rolls $A' A^2$ by any suitable means. (Not shown.)

The essential feature of the present invention is a table or platen B, which extends beneath the bale-core $A^3$ and closely adjacent to the compression-rolls $A' A^2$. The table or platen B is preferably made of sheet metal, but may be made of any other suitable material, and is supported in such manner as to admit of its being removed or retracted from beneath the bale-core or the bale formed thereon, so that a vertically-unobstructed space will be left between the adjacent sides of the compression-rolls $A' A^2$ to permit the discharge of the finished bale beneath the press.

Referring now particularly to Fig. 1 of the drawings, in which the preferable form of my device is shown, the platen B is rigidly secured to levers B', pivoted between their ends to rigid portions of the press-frame A at $b$. Said platen B is maintained, normally, in operative position by weights $B^2$, applied to the levers B', and by stops $b'$, which limit the upward pivotal movement of said platen under the influence of the weights $B^2$. As no appreciable weight or pressure is imposed upon the platen B, it is obvious that the weights $B^2$ need be only sufficiently heavy to a little more than counterbalance the weight of said platen.

With the construction shown it is apparent that depression of the free end of the platen B will cause it to swing beneath the compression-roll A', leaving the desired vertically-unobstructed space beneath the bale-core $A^3$ or the bale formed thereon to permit of the discharge of the bale beneath the press. It is also apparent that when a bale is discharged its weight will operate to depress the free end of the platen and swing said platen beneath the compression-roll A' and out of the way of said bale, also that, said bale having been discharged, the weights $B^2$, applied to said platen, will cause it to assume its normal position beneath the bale-core. Said platen is thus manipulated automatically and requires no attention from those operating the press.

In order to provide for sufficient pivotal movement of the platen B to remove said platen out of the path of bales when they are discharged from the press, the weighted ends of the levers B' are downwardly deflected at their pivotal points, so that they will not come into contact with any part of the press.

Referring now particularly to Figs. 2 and 3 of the drawings, in which the modified form of my device is shown, the platen B is supported upon bars $B^3$, rigidly secured to the press-frame A, which engage suitable guide-grooves $b^2$, formed on said platen, as clearly shown in Fig. 3 of the drawings, said platen being movable on said bars longitudinally of the press. Provision is thus made for withdrawing the platen B from beneath the bale-core or the bale formed thereon when it is desired to discharge the bale, thus leaving the desired vertically-unobstructed space beneath the same.

Both forms of the device operate in the same manner to support the bat of cotton in case it sags between the compression-rolls at the under side of the bale and to guide it around said bale in case it breaks.

When the form of guide-platen shown in Figs. 2 and 3 is used it will have to be withdrawn before discharging the bale; but when the pivoted platen shown in Fig. 1 is used the weight of the bale will operate to depress the same, as hereinbefore stated.

I claim—

1. In a rotary cotton-press, the combination with a compression-roll, supported in stationary bearings, a bodily-movable compression-roll, and a bale-core, both supported in sliding bearing-blocks, of a platen, which extends beneath said bale-core and closely adjacent to said compression-rolls, substantially as described.

2. In a rotary cotton-press, the combination with a compression-roll, supported in stationary bearings, a bodily-movable compression-roll, and a bale-core, both supported in sliding bearing-blocks, of a platen, which extends beneath said bale-core and closely adjacent to said compression-rolls, and being so supported that it may be retracted from beneath said bale-core, substantially as described.

3. In a rotary cotton-press, the combination with a compression-roll, supported in stationary bearings, a bodily-movable compression-roll, and a bale-core, both supported in sliding bearing-blocks, of a platen, which extends beneath said bale-core and closely adjacent to said compression-rolls, said table or platen being pivotally supported in such manner that depression of its free end or side will leave a vertically-unobstructed space beneath said bale-core, substantially as described.

4. In a rotary cotton-press, the combination with a compression-roll, supported in stationary bearings, a bodily-movable compression-roll, and a bale-core, both supported in sliding bearing-blocks, of a pivotally-supported platen, a weight or weights applied to said platen, whereby it will be maintained, normally, at its extreme elevation, in which position it extends beneath the bale-core and closely adjacent to the compression-rolls, stops which limit the pivotal movement of said platen under the influence of said weights and which determine the extreme elevation thereof, the point of pivotal support of said platen being so located that depression of the free end of said platen will leave an unobstructed space for the discharge of the bale, beneath said press, substantially as described.

In testimony that I claim the foregoing as my invention I hereunto set my hand this 2d day of November, 1895.

MAGNUS SWENSON.

Witnesses:
B. A. JOHNSTON,
J. H. GIBSON.